(12) United States Patent
Dulong

(10) Patent No.: US 7,093,102 B1
(45) Date of Patent: Aug. 15, 2006

(54) CODE SEQUENCE FOR VECTOR GATHER AND SCATTER

(75) Inventor: Carole Dulong, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/538,012

(22) Filed: Mar. 29, 2000

(51) Int. Cl.
*G06F 12/06* (2006.01)

(52) U.S. Cl. .................... 711/217; 711/220; 712/4; 712/5; 712/225

(58) Field of Classification Search .......... 712/4, 712/5, 225; 710/24
See application file for complete search history.

(56) References Cited

U.S. PATENT DOCUMENTS

| | | | | |
|---|---|---|---|---|
| 2,968,027 A | * | 1/1961 | McDonnell et al. | 711/220 |
| 3,163,850 A | * | 12/1964 | Austin et al. | 711/200 |
| 3,395,397 A | * | 7/1968 | King | 711/202 |
| 3,973,244 A | * | 8/1976 | Lovercheck et al. | 345/472 |
| 5,008,786 A | * | 4/1991 | Thatte | 711/162 |
| 5,206,822 A | * | 4/1993 | Taylor | 708/607 |
| 5,895,501 A | * | 4/1999 | Smith | 711/207 |

OTHER PUBLICATIONS

IBM, "Overlapped Peripheral Block Transfer Unit", May 1966, IBM Technical Disclosure Bulletin, vol. 8, Issue 12, pp. 1734-1735.*

"Pipelined Computers", Parallel Computers, RW Hockney and CR Jesshope, 1981, pp. 73-93.

* cited by examiner

*Primary Examiner*—Mano Padmanabhan
*Assistant Examiner*—Craig E Walter
(74) *Attorney, Agent, or Firm*—Blakely, Sokoloff, Taylor & Zafman LLP

(57) ABSTRACT

Gather and scatter operations are used when elements of a vector which may be operated on in parallel are not located at successive addresses in memory. Prior data processing systems required complex address calculation hardware and other hardware to perform vector gather and scatter operations. By contrast, one embodiment of the present invention implements gather and scatter operations using a plurality of deposit and extract instructions. As a result, gather and scatter operations may be efficiently performed within a general purpose processing environment and without the need for dedicated gather/scatter hardware.

22 Claims, 11 Drawing Sheets

| .243 | 0 | 0 | 0 | 1.542 | 0 |
|------|------|---|---|-------|---|
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | .256 | 0 |
| 0 | .020 | 0 | 0 | 0 | 0 |

FIG. 1

(PRIOR ART)

Extract

Deposit

| ADD R6 = R2 (Base), R5 (I0) | 0 | R6 |
|---|---|---|
| I0 + Base | 64 | |

| ADD R9 = R2 (Base), R8 (I1) | 0 | R9 |
|---|---|---|
| I1 + Base | 64 | |

| ADD R12 = R2 (Base), R11 (I2) | 0 | R12 |
|---|---|---|
| I2 + Base | 64 | |

| ADD R15 = R2 (Base), R14 (I3) | 0 | R15 |
|---|---|---|
| I3 + Base | 64 | |

FIG. 7

DEP R4 = R4, R7, 0, 16

| R4 |
|---|
| E0 |
|  |

DEP R4 = R4, R10, 16, 16

| R4 |
|---|
| E0 |
| E1 |
|  |

DEP R4 = R4, R13, 32, 16

| R4 |
|---|
| E0 |
| E1 |
| E2 |
|  |

DEP R4 = R4, R16, 48, 16

| R4 |
|---|
| E0 |
| E1 |
| E2 |
| E3 |

CODE SEQUENCE FOR VECTOR GATHER AND SCATTER

BACKGROUND OF THE INVENTION

1. Field of the Invention

This invention relates generally to the field of processor operations. More particularly, the invention relates to an apparatus and method for performing vector gather and scatter operations using a computer processor.

2. Description of the Related Art

In order to perform vector computations on a computer, matrices such as that illustrated in FIG. 1 must frequently be loaded into memory. Once in memory, the matrix may be combined with other matrices (not shown) to perform complex, multidimensional computations (e.g., vector addition, vector multiplication).

One problem which exists, however, is that matrices can take up a substantial amount of memory, particularly when used to store certain types of data (e.g., scientific data pertaining to physical phenomenon). In addition, matrices may be sparsely populated with data elements. For example, only 4 data elements out of the 24 illustrated in FIG. 1 contain non-zero values, resulting in an inefficient use of memory.

To conserve memory when working such large, sparsely populated matrices, "gather" and "scatter" operations were developed. For example, the CRAY-1 computer system performed gather operations to collect the elements of a matrix from memory and store them in a highly compressed format (e.g., sorted contiguously in an ordered array). Conversely, when necessary to perform various matrix operations (e.g., matrix multiplication) the CRAY-1 performed scatter operations to reproduce the previously-gathered matrix in memory.

One problem which exists, however, is that these systems require complex dedicated hardware to perform the gather and scatter operations. For example, the CRAY-1 employed a vector processor which performed gather and scatter operations using dedicated registers to hold index vectors and dedicated address calculation hardware.

Accordingly, what is needed is a more efficient apparatus and method for storing and working with matrices in a computing environment. What is also needed is a system and method for performing gather and scatter operations on a general purpose processor.

SUMMARY OF THE INVENTION

A system and method are described for performing gather and scatter operations on a general purpose computer. For example, a method for performing a gather operation is described which includes the operations of: computing addresses for a plurality of data elements of a matrix stored in memory, wherein each data element is identified by one of an equal plurality of indices and a base address; and wherein computing addresses comprises executing an equal plurality of EXTRACT instructions to transfer a plurality of the indices from a first storage location where the indices are stored substantially contiguously, to an equal plurality of separate storage locations, wherein each index is assigned its own separate storage location; and adding the base address to each index, wherein each addition of the base address to each index is independent of one another; retrieving each of the plurality of data elements from memory based on the computed addresses; and executing an equal plurality of DEPOSIT instructions, each DEPOSIT instruction depositing one or more of the data elements contiguously with other data elements in a general purpose register.

BRIEF DESCRIPTION OF THE DRAWINGS

A better understanding of the present invention can be obtained from the following detailed description in conjunction with the following drawings, in which:

FIG. 1 illustrates matrix with data elements which may be stored in a computer memory.

FIG. 7 illustrates address calculation and storage operations according to one embodiment of the invention.

FIG. 9 illustrates the merging of data elements in a register according to one embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of the present invention include various steps, which will be described below. The steps may be embodied in machine-executable code. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

An Exemplary Computer System

Figure 2:
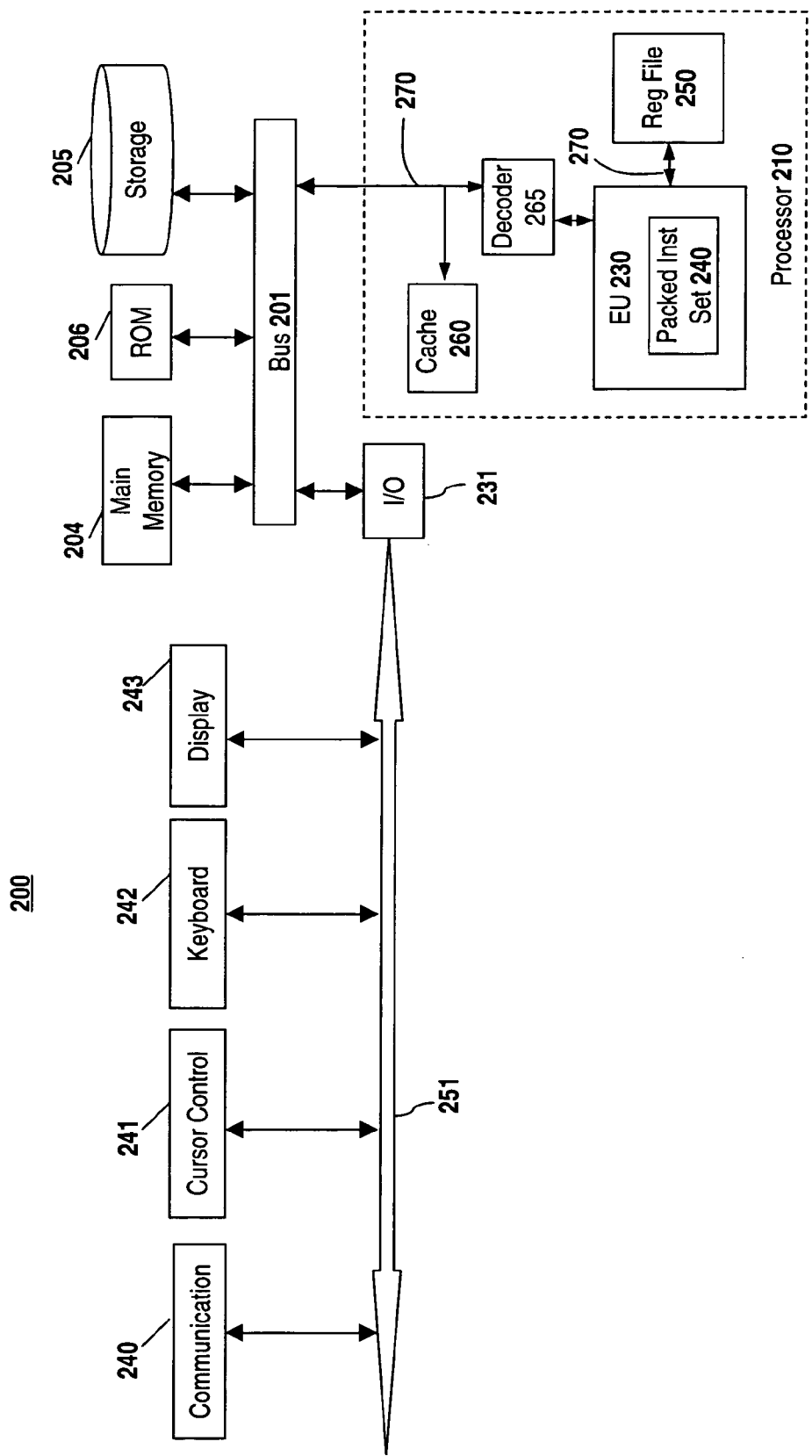
FIG. 2 illustrates an exemplary computer architecture used to implement elements of the invention.

FIG. 2 shows a computer system 200 upon which embodiments of the invention may be implemented. Computer system 200 comprises a bus 201 for communicating information, a processor 210 coupled to the bus 201 for processing information, and a memory subsystem 204–206 coupled to bus 201 for storing information and instructions for the processor 210. The memory subsystem may be comprised of a main memory 204, a read only memory 206 and/or a mass storage device 205.

The processor 210 includes an execution unit 230, a register file 250, a cache memory 260, a decoder 265, and an internal bus 270. The cache memory 260, storing frequently and/or recently used information for the processor 210, is coupled to the execution unit 230. Register file 250 is comprised of a group of registers for storing data to be read by the execution unit 230 via the internal bus 270. In one embodiment, the registers within the register file 250 store sixty-four bits of packed data for integer and/or floating point calculations.

The execution unit 230 operates on packed data according to the instructions received by processor 210 that are included in a packed instruction set 240. The execution unit 230 also operates on non-packed data according to instructions implemented in general-purpose processors. In one embodiment the processor 210 is an Explicitly Parallel Instruction Computing ("EPIC") processor (e.g., employing the IA-64 parallel architecture developed by Intel®), capable of executing multiple instructions per clock cycle. In addition, processor 210 in one embodiment is capable of supporting the Intel Itanium™ microprocessor instruction set as well as the packed instruction set 240. Other instruction sets, such as the Pentium®, PowerPC™ and the Alpha® processor instruction sets may also be used in accordance with the described invention. Pentium and Itanium are trademarks of Intel Corporation. PowerPC™ is a trademark of IBM, APPLE COMPUTER, and MOTOROLA. Alpha™ is a trademark of Digital Equipment Corporation.

Still referring to FIG. 2, computer system 200 can also be coupled to a second I/O bus 250 via an I/O interface 230. A plurality of I/O devices may be coupled to I/O bus 250, including, for example, a display device 243, an alphanumeric input device 242 (e.g., a keyboard), a cursor control device 241 and/or a communication device 240. The communication device 240 is for accessing other computers and may comprise a modem, a network interface card, or other well known interface device, such as those used for coupling to Ethernet, token ring, or other types of networks.

Data and Storage Formats

Figure 3:
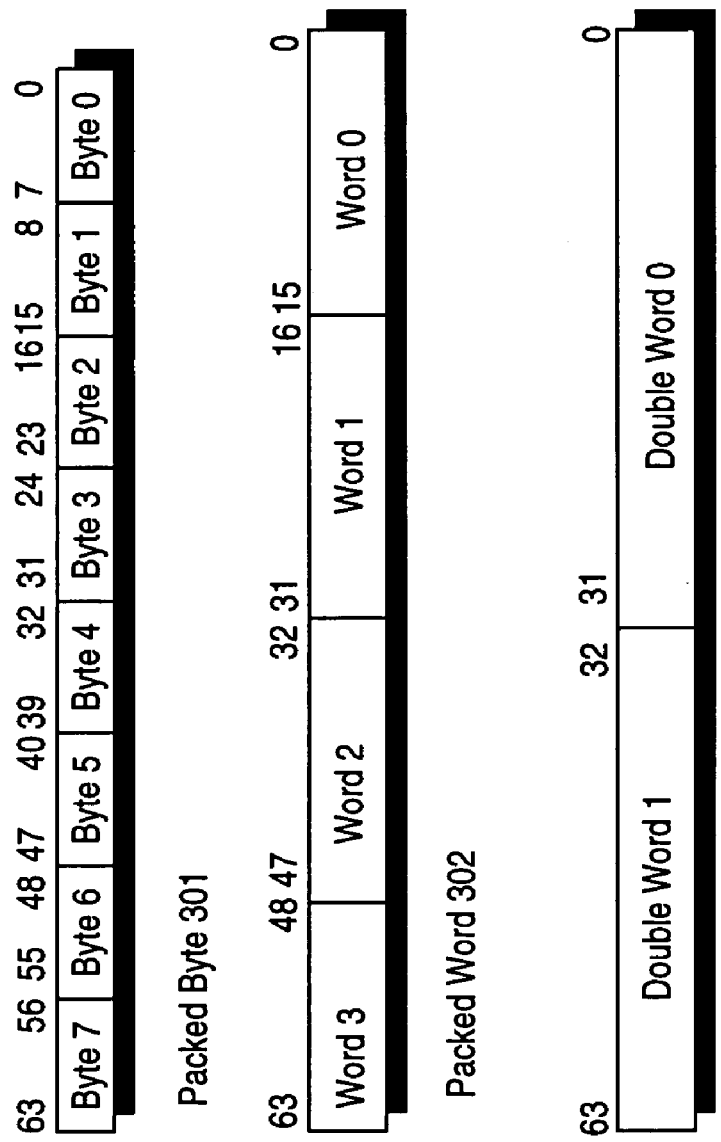
FIG. 3 illustrates a variety of data and data storage formats according to embodiments of the invention.

FIG. 3 illustrates three packed data-types: packed byte 301, packed word 302, and packed doubleword (dword) 303. Packed byte 301 is sixty-four bits long containing eight packed byte data elements. Generally, a data element is an individual piece of data that is stored in a single register (or memory location) with other data elements of the same length. In packed data sequences, the number of data elements stored in a register is the register size (e.g., 64-bits in the embodiment illustrated in FIG. 3) divided by the length in bits of a data element. Although the registers illustrated in FIG. 3 and described throughout the specification are 64-bit registers, it should be noted that the underlying principles of the invention may be implemented on registers of virtually any size.

Extract and Deposit Operations

Figure 4A:
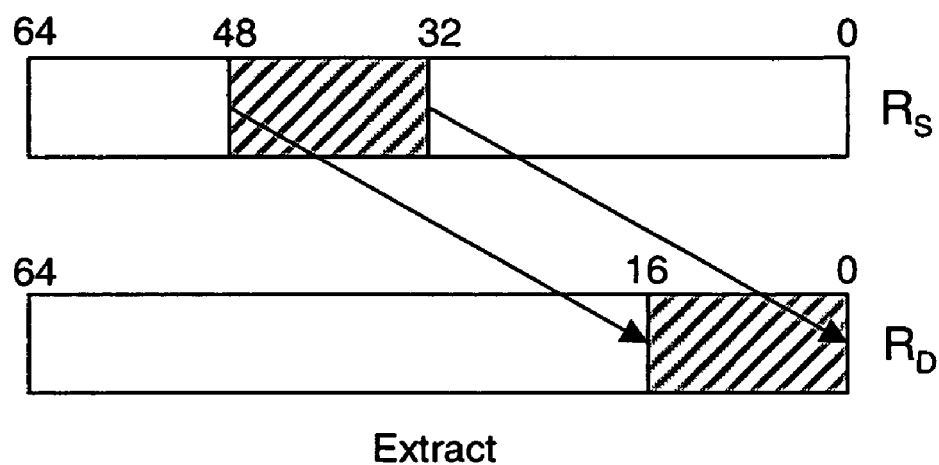
FIG. 4 illustrates extract and deposit operations according to embodiments of the invention.
Figure 4B:
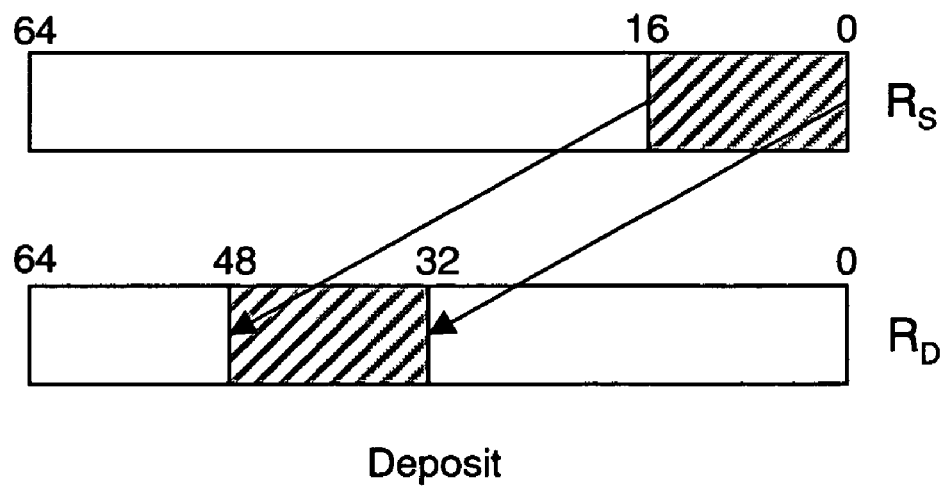

FIGS. 4a and 4b illustrate two data operations which may be used in one embodiment of the invention. As illustrated in FIG. 4a, an "extract" operation involves copying a specified bit field from a source register $R_S$ to an aligned position within a destination register $R_D$ (i.e., the least significant bit (LSB) of the bit field is aligned with bit zero of the destination register $R_D$). Conversely, a "deposit" operation, as illustrated in FIG. 4b, copies a specified bit field from an aligned position in a source register $R_S$ to a specified location within a destination register $R_D$.

In one embodiment, individual extract and deposit instructions are included in the packed instruction set 240. Accordingly, the extract instruction may be used to copy a data element from a source register to an aligned position in a destination register. For example, the instruction EXTR $R_D$=$R_S$, 32, 16 copies a data element 16 bits in length located at bit 32 in the source register (i.e., the LSB of the data element is positioned at bit 32 of the source register) to an aligned position in a destination register as illustrated in FIG. 4a.

Similarly, a deposit instruction may be used to copy a data element aligned in a source register to a specified position in a destination register. For example, the instruction DEP $R_D$=$R_D$, $R_S$, 16, 32, copies a 16 bit data element aligned in a source register to a position starting at bit 32 (i.e., the LSB of the data element is aligned with bit 32 of the destination register as illustrated in FIG. 4b). In this embodiment, the RD designation to the right of the equal sign indicates that data elements stored in the remaining bit positions of the destination register should not be overwritten (e.g., with zeros). As described below, this feature allows a series of packed data elements to be merged into a single register.

Gather Operation

In one embodiment of the apparatus and method, extract and deposit operations are used to perform "gather" operations in which non-zero data elements of a matrix are retrieved (i.e., "gathered") from memory and stored in a contiguous manner.

Figure 5:
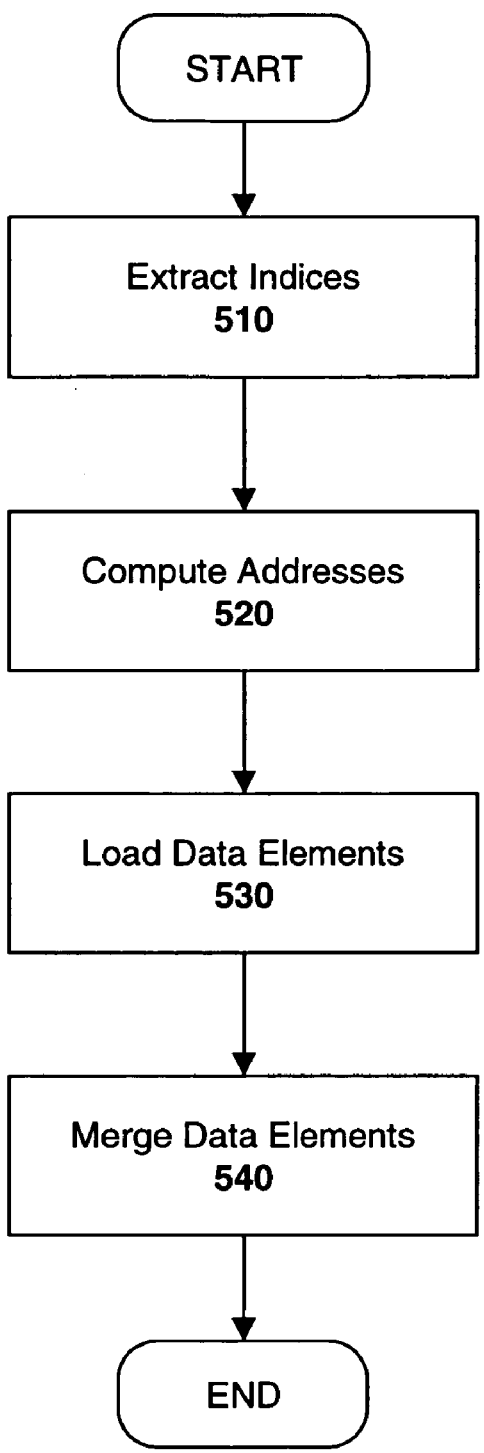
FIG. 5 illustrates one embodiment of a method for performing a gather operation.
Figure 6:
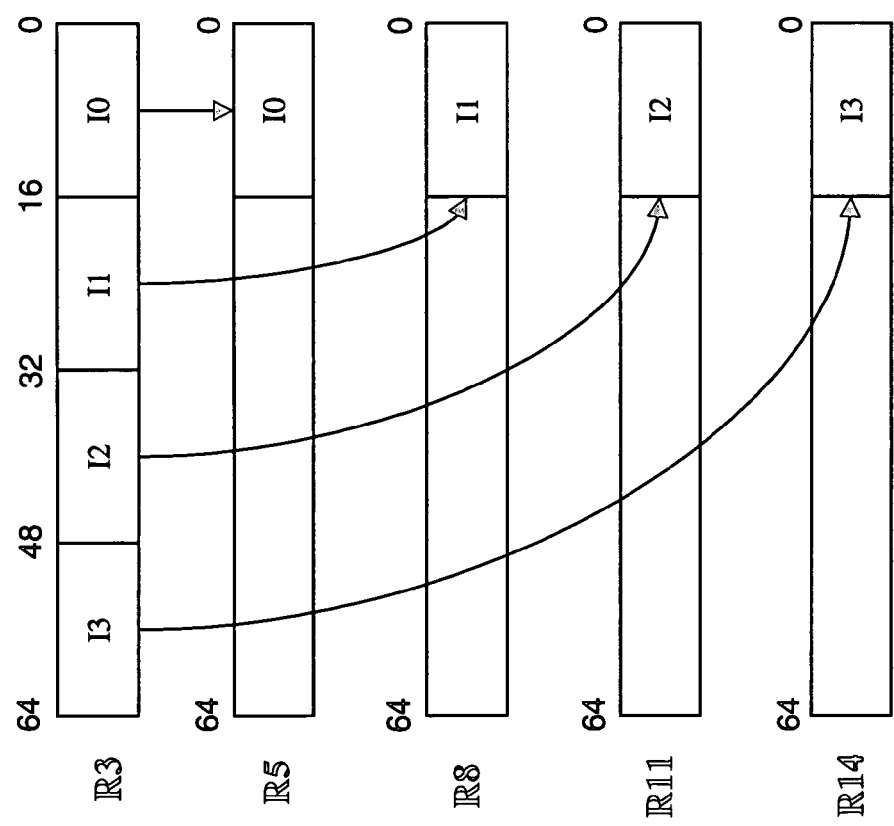
FIG. 6 illustrates the extraction of a set of address indices according to one embodiment of the invention.

As set forth in the flowchart in FIG. 5, in one embodiment, a plurality of address indices are extracted into an equal plurality of destination registers (at 510). Each of the indices, when combined with a base address, specifies an address in memory where a matrix data element is stored. For example, as illustrated in FIG. 6, four indices I0, I1, I2, and I3 packed in a single register, R3, are extracted into four individual registers, R5, R8, R11, and R14, respectively. Four extract instructions (e.g., EXTR R5=R3, 0, 16 for I0) may be executed to perform this operation. In the particular embodiment illustrated in FIG. 6 each of the indices are 16-bits in length. However, it should be noted that indices of varying lengths may also be used in accordance with the underlying principles of the invention.

Addresses for each of the data elements are then computed at 520 (FIG. 5) by adding each of the indices to the base address stored in R2. Thus, in the embodiment illustrated in FIG. 7, the base address is added to each of the indices in R5, R8, R11, and R14 and the result (i.e., the addresses in memory of each of the data elements) are stored in registers R6, R9, R12 and R15, respectively.

Figure 8:
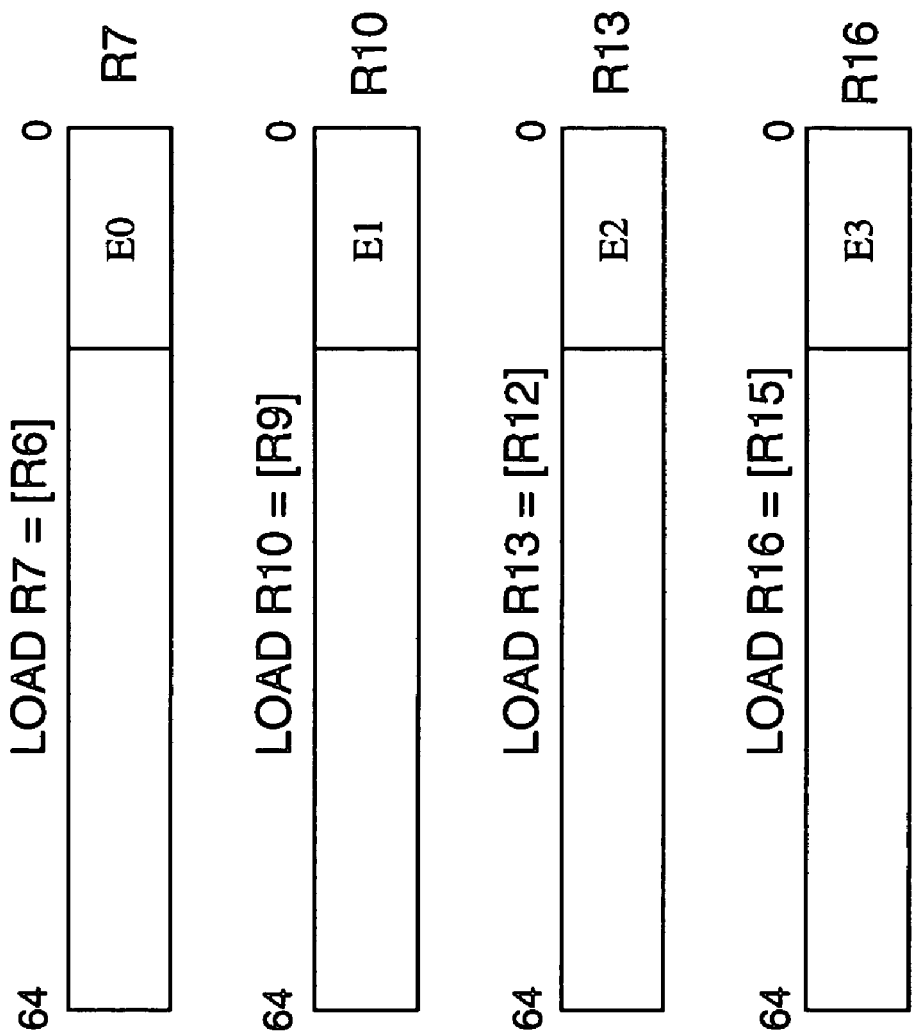
FIG. 8 illustrates memory load operations according to one embodiment of the invention.

The processor 210, at 530 (FIG. 5), then loads the data elements from memory into a group of registers. For example, in the embodiment illustrated in FIG. 8, data elements E0, E1, E2, and E3 are loaded from memory (after being identified via the calculated addresses) into registers R7, R10, R13 and R16, respectively.

At 540 (FIG. 5), the data elements are merged into a single register. In one embodiment, this is accomplished using deposit operations. For example, referring to FIG. 9, a series of deposit operations copy, in succession, E0, E1, E2, and E3 into register R4. The end result is that data elements E0–E3, which may have been scattered throughout a matrix, are now stored contiguously in register R4 (and/or a mass storage device), thereby preserving a substantial amount of memory.

Scatter Operation

Figure 10:
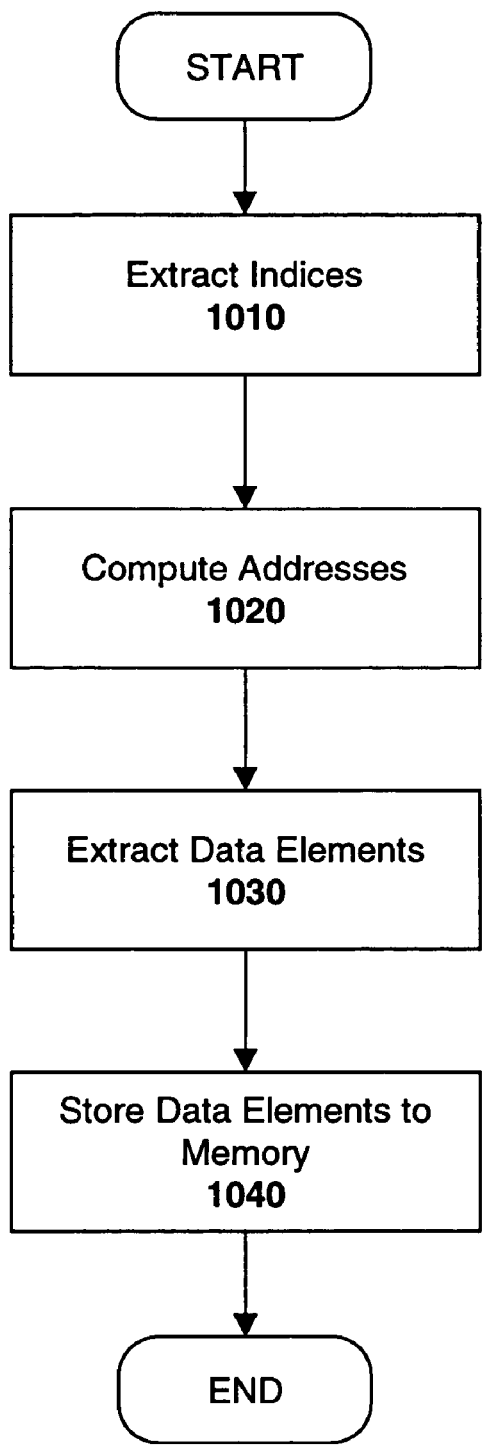
FIG. 10 illustrates one embodiment of a method for performing a scatter operation.

The matrix containing data elements E0–E3 may need to be reconstructed in memory from time to time so that matrix operations can be performed (e.g., matrix multiplication, addition . . . etc). In one embodiment, a "scatter" operation is used to carry out this function. Referring to FIG. 10, in one embodiment of the scatter operation, indices are extracted (at 1010) and added to a base address to compute the addresses in memory to which the data elements will be scattered (at 1020). This portion of the scatter operation may be similar to the first portion of the gather operation described above (e.g., 510, 520 of FIG. 5).

Figure 11:
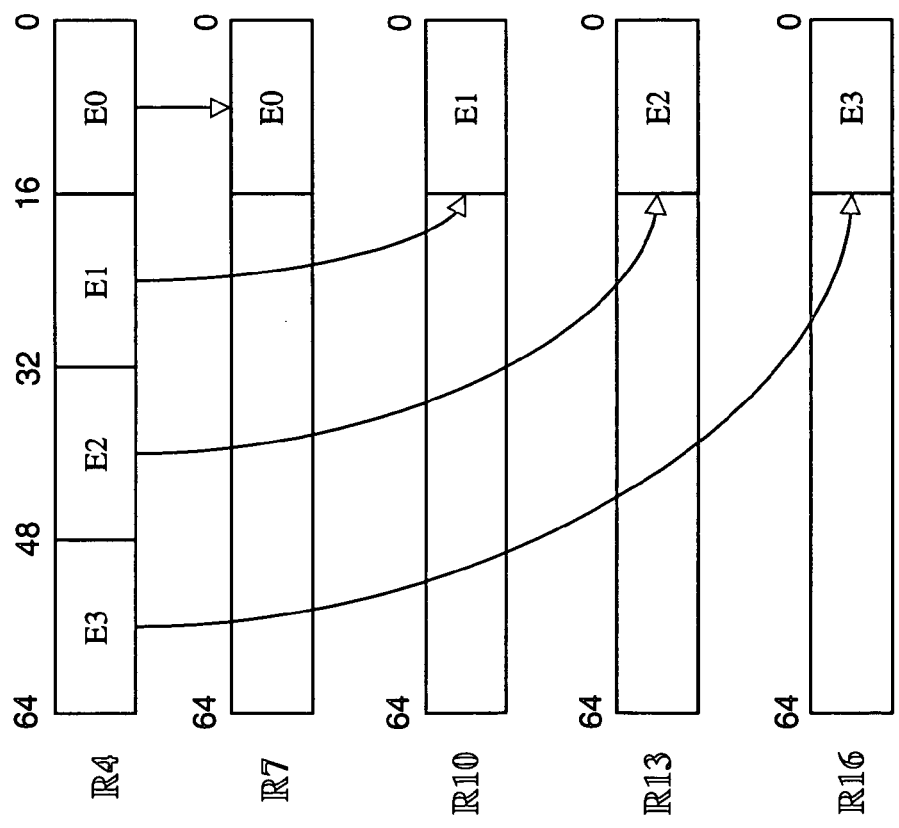
FIG. 11 illustrates performing an extract operation on a plurality of data elements according to one embodiment of the invention.

At 1030 the data elements are extracted from the register into which they were merged. Thus, as illustrated in FIG. 11, each of the data elements E0, E1, E2 and E3 are extracted from register R4 and copied into registers R7, R10, R13, and R16, respectively (e.g., for element E2 the extract instruction might read EXTR R13=R4, R13, 32, 16). Finally, at 1040, the data elements are stored to memory based on their previously-calculated addresses. A store instruction such as STORE [R12]=R13 may be executed by the processor 210 to perform this function (i.e., the data element from R13 is stored to the memory location found in R12).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method for performing a gather operation on a general purpose computer processor comprising:
   computing addresses for a plurality of data elements of a matrix stored in memory, wherein:
      each data element is identified by one of an equal plurality of indices and a base address; and
      computing addresses comprises:
         executing an equal plurality of EXTRACT instructions to transfer a plurality of said indices from a first storage location where the indices are stored substantially contiguously, to an equal plurality of separate storage locations, wherein each index is assigned its own separate storage location; and
         adding said base address to each index, wherein each addition of said base address to each index is independent of one another;
   retrieving each of said plurality of data elements from memory based on the computed addresses; and
   executing an equal plurality of DEPOSIT instructions, each DEPOSIT instruction depositing one or more of said data elements contiguously with other data elements in a general purpose register.

2. The method as in claim 1 wherein said storage locations are general purpose registers within a general purpose processor.

3. The method as in claim 1 further comprising:
   loading each of said data elements from memory into separate storage locations prior to executing said second plurality of instructions.

4. The method as in claim 1 wherein said computer processor executes two or more of said first and/or second plurality of instructions in a single clock cycle.

5. The method as in claim 1 further comprising:
   storing each of said data elements on a mass storage device.

6. A method as in claim 1 wherein computing addresses comprises:
   executing a series of instructions, each instruction to extract an address index for one of said plurality of data elements.

7. The method as in claim 1 wherein the distances between a plurality of two neighboring indices within the plurality of said indices are of varying lengths.

8. The method as in claim 2 wherein said registers are 64-bits wide and said data elements are 16-bits in length.

9. The method as in claim 6 wherein said address indices are extracted from a series of contiguous memory locations.

10. A method for performing a scatter operation on a general purpose computer processor comprising:
    executing a first plurality of EXTRACT instructions to extract indices for each of a plurality of data elements, the indices being extracted into separate storage locations;
    using the extracted indices to calculate addresses in memory to which said plurality of data elements are to be scattered to form a matrix in memory wherein each address in memory is identified by one of a plurality of indices and a base address, and further wherein each address in memory is calculated by adding said base address to each index of said plurality of indices, wherein each addition of said base address to each index is independent of one another;
    executing a second plurality of EXTRACT instructions, each of said EXTRACT instructions extracting one or more of said data elements from a general purpose register in which said data elements are stored contiguously to an equal plurality of separate storage locations; and
    transferring said data elements from said separate storage locations to said calculated addresses in memory.

11. The method as in claim 10 wherein each of said storage location is a general purpose register.

12. The method as in claim 10 wherein storing each of said data elements is accomplished via a plurality of STORE instructions executed by said computer processor.

13. The method as in claim 10 wherein said computer processor executes two or more of said instructions in a single clock cycle.

14. The method as in claim 10 wherein the distances between a plurality of two neighboring indices within the plurality of said indices are of varying lengths.

15. The method as in claim 11 wherein said register is 64-bits wide and said data elements are 16-bits in length.

16. A computer system comprising:
    a memory;
    a general purpose processor communicatively coupled to the memory; and
    a storage device communicatively coupled to the processor and having stored therein a sequence of instructions which, when executed by the processor, causes the processor to at least,
       compute addresses for a plurality of data elements of a matrix stored in memory, wherein:
          each data element is identified by one of an equal plurality of indices and a base address; and
          computing addresses comprises:
             executing an equal plurality of EXTRACT instructions to transfer a plurality of said indices from a first storage location where the indices are stored substantially contiguously, to an equal plurality of separate storage locations, wherein each index is assigned its own separate storage location; and adding said base address to each index, wherein each addition of said base address to each index is independent of one another;

retrieve each of said plurality of data elements from memory based on the computed addresses; and execute an equal plurality of DEPOSIT instructions, each deposit instruction depositing one or more of said data elements contiguously with other data elements in a general purpose register.

17. The computer system as in claim 16 wherein said storage locations are general purpose registers.

18. The computer system as in claim 16 wherein said processor loads each of said data elements from memory into separate storage locations prior to executing said second plurality of instructions.

19. The computer system as in claim 16 wherein, responsive to one or more instructions in said sequence, said processor further:

stores each of said data elements on said mass storage device.

20. The method as in claim 16 wherein the distances between a plurality of two neighboring indices within the plurality of said indices are of varying lengths.

21. The computer system as in claim 17 wherein said registers are 64-bits wide and said data elements are 16-bits in length.

22. The computer system as in claim 18 wherein said processor executes two or more of said first and/or second plurality of instructions in a single clock cycle.

* * * * *